ment of a distortion of the first through (a−1)-th symbols and
an estimate of a distortion of the (a+1)-th through M-th sym-
bols, where 1≦a≦M. The first stage predistortion unit is
operable to generate a predistorted symbol ã based on the
symbol a of the first plurality of symbols and the distorted
symbol vector. Further, a receiver unit can cancel interference
in the received signals to account for adjacent channel inter-
ference.

(12) United States Patent
Beidas et al.

(10) Patent No.: US 8,355,462 B2
(45) Date of Patent: Jan. 15, 2013

(54) SYSTEM AND METHOD FOR COMBINED PREDISTORTION AND INTERFERENCE CANCELLATION IN A SATELLITE COMMUNICATIONS SYSTEM

(75) Inventors: Bassel Beidas, Alexandria, VA (US); Stan Kay, Rockville, MD (US); Neal Becker, Frederick, MD (US)

(73) Assignee: Hughes Network Systems, LLC, Germantown, MD (US)

( * ) Notice: Subject to any disclaimer, the term of this patent is extended or adjusted under 35 U.S.C. 154(b) by 523 days.

(21) Appl. No.: 12/608,430

(22) Filed: Oct. 29, 2009

(65) Prior Publication Data

US 2011/0103507 A1    May 5, 2011

(51) Int. Cl.
    *H04L 25/03* (2006.01)
(52) U.S. Cl. ........ 375/296; 375/295; 375/285; 375/260; 375/259; 375/297; 375/267; 455/114.2; 455/114.3
(58) Field of Classification Search .................. 375/295, 375/296, 285, 260, 259, 297, 267; 455/114.2, 455/114.3
See application file for complete search history.

(56) References Cited

U.S. PATENT DOCUMENTS

| | | | | |
|---|---|---|---|---|
| 4,967,164 A | * | 10/1990 | Sari | 330/149 |
| 5,107,520 A | * | 4/1992 | Karam et al. | 375/296 |
| 2005/0013384 A1 | * | 1/2005 | Gregoire | 375/296 |
| 2011/0075774 A1 | * | 3/2011 | Hiben et al. | 375/350 |

* cited by examiner

Primary Examiner — Siu Lee
(74) Attorney, Agent, or Firm — K&L Gates LLP (57) ABSTRACT

The present invention provides a communication system for use with a first source signal and a second source signal. The first source signal is on a first channel and includes M symbols, where M is an integer greater than 1. The second source signal is on a second channel and includes X symbols, where X is an integer greater than 1. The first channel is different from the second channel. The communication system includes a first modulator unit, a second modulator unit and an adder. The first modulator unit can generate a first modulated signal based on the first source signal and includes a first inter-symbol distortion estimating unit and a first stage predistortion unit. The second modulator unit can generate a second modulated signal based on the second source signal and includes a second inter-symbol distortion estimating unit and a predistortion unit. The adder can generate an added signal based on the first modulated signal and the second modulated signal. The first inter-symbol distortion estimating unit can generate a distorted symbol vector based on an esti-

18 Claims, 7 Drawing Sheets

SYSTEM AND METHOD FOR COMBINED PREDISTORTION AND INTERFERENCE CANCELLATION IN A SATELLITE COMMUNICATIONS SYSTEM

BACKGROUND

The present invention is generally drawn to transmitters using high power amplifiers (HPAs), for example in satellite communications. Satellite communication systems must transmit signals vast distances from earth to satellites in orbit and vice versa. Additionally, satellites have strict power consumption limits that require the communication systems to operate at very high efficiencies of both power use and usage of available communication bandwidth.

Many satellites use HPAs for communication purposes. Typically, HPAs operate most efficiently at (or near) saturation. Unfortunately, operation of HPAs at (or near) saturation can lead to inter-symbol interference (ISI) in output channels.

The output of a transmitter can be seen as a sequence of symbols called a phrase. Each symbol represents a sequence of bits, in the case of 8PSK, each symbol represents 3 bits. A transmitter will output the phrase one symbol at a time during transmission. As a transmitter shifts from one symbol to the next in the phrase, previous and future output symbols may cause interference in the output of the current symbol. This interference in the current symbol caused by past and future symbols is ISI.

To further increase efficiency in satellite communication, a single transmitter may be used to transmit multiple channels. A problem, however, in systems that use a single transmitter to transmit multiple channels, i.e., multi-channel transmitters, is spectral spreading, wherein one channel "bleeds over" into another channel, which is referred to as adjacent channel interference (ACI). This ACI problem worsens as the spacing between channels decreases. Further, if a single HPA for a multi-channel transmitter is driven at or near saturation, the ACI problem compounds and becomes too large to enable a receiver to receive any one channel.

Conventional satellite communication systems with HPAs have been able to address ISI over a single channel. Conventional satellite communication systems with HPAs that have addressed ISI have not been able to additionally correct for ACI. Accordingly, conventional satellite communication systems with HPAs that have addressed ISI are not able to transmit over a plurality of channels.

In essence, conventional satellite communication systems with HPAs are able to: drive a single HPA in or near saturation while efficiently communicating over a single channel; or inefficiently communicate over a plurality of channels without driving a single HPA in or near saturation.

An example conventional transmitter for use in a conventional satellite communication system with an HPA will now be described with reference to FIG. 1.

Figure 1:
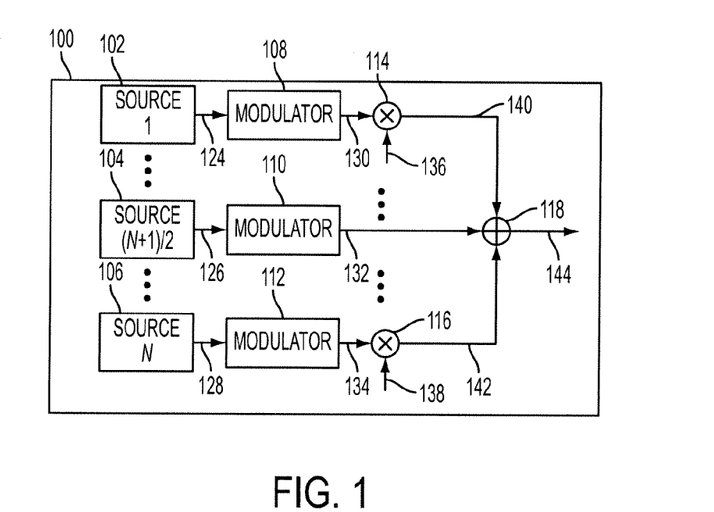
FIG. 1 illustrates a conventional multi-channel transmitter.

A conventional multi-channel transmitter is shown in FIG. 1. Transmitter 100 includes a an integer number of signal sources. It should be recognized that a conventional multi-channel transmitter may be designed with a desired number of signal sources. In this example, three signal sources— signal source 102, signal source 104 and signal source 106, are shown, wherein the remaining number (as may be designed) are illustrated by way of dots. Transmitter 100 additionally includes modulator 108, modulator 110, modulator 112, mixer 114, mixer 116 and adder 118.

Signal source 102 generates source signal 124, which is passed to modulator 108. Modulator 108 uses source signal 124 to generate modulated signal 130. Mixer 114 mixes oscillator signal 136 and modulated signal 130 to create channel signal 140, the component of output signal 144 associated with the channel associated with signal source 102. Signal source 104 generates source signal 126, which is passed to modulator 110. Modulator 110 uses source signal 126 to generate modulated signal 132. Although not shown, modulated signal 132 will additionally be mixed with an appropriate oscillator signal to create a distinct channel. A component of output signal 144 will include the mixed modulated signal 132 associated with the channel associated with signal source 104. Signal source 106 generates source signal 128, which is passed to modulator 112. Modulator 112 uses source signal 128 to generate modulated signal 134. Mixer 116 mixes oscillator signal 138 and modulated signal 134 to create channel signal 142, the component of output signal 144 associated with the channel associated with signal source 106. Adder 118 takes modulated signal 132, channel signal 140, and channel signal 142 and adds them to create output signal 144. Further, it should be noted that any further channels included (such as those represented by the dots in the figure) will have generated respective mixed modulated signals that will have been added at adder 118 to be included in output signal 144.

FIG. 1 shows a signal paths with two side sources, signal source 102 and signal source 106, around a main source, signal source 104. As mentioned above, any number of sources may represent a multiple channel transmission system, where each source would be modulated and then mixed before being added to the main output signal. This would be similar to the path of signal source 102 generating source signal 124 to be modulated to modulated signal 130 by modulator 108, which is then mixed with oscillator signal 136 by mixer 114 to create channel signal 140 to be added to output signal 144 by adder 118.

Output signal 144 is then provided to an HPA (not shown) for transmission to a receiver (not shown). Clearly, output signal 144 includes signals from a plurality of channels. As discussed above, in a conventional satellite communication system, the HPA would not be driven at or near saturation in order to transmit output signal 144.

What is needed is an improved communication system employing an HPA that is operable to communicate over a plurality of channels while the HPA is driven at or near saturation.

BRIEF SUMMARY

In accordance with aspects of the present invention, a communication system employing an HPA that is operable to communicate over a plurality of channels while the HPA is driven at or near saturation by predistorting the transmitted signals to account for ISI and by canceling interference in the received signals to account for ACI.

An aspect of the present invention provides a communication system employing a high power amplifier driven at or near saturation, having a first source signal and a second source signal. The first source signal is on a first channel and includes M symbols, where M is an integer greater than 1. The second source signal is on a second channel and includes X symbols, where X is an integer greater than 1. The first channel is different from the second channel. The communication system includes a first modulator unit, a second modulator unit and an adder. The first modulator unit can generate a first modulated signal based on the first source signal and includes a first inter-symbol distortion estimating unit and a first stage predistortion unit. The second modulator unit can generate a second modulated signal based on the second source signal and includes a second inter-symbol distortion estimating unit and a predistortion unit. The adder can generate an added signal based on the first modulated signal and the second modulated signal. The first inter-symbol distortion estimating unit can generate a distorted symbol vector based on an estimate of a distortion of the first through (a−1)-th symbols and an estimate of a distortion of the (a+1)-th through M-th symbols, where $1 \leq a \leq M$. The first stage predistortion unit is operable to generate a predistorted symbol ã based on the symbol a of the first plurality of symbols and the distorted symbol vector.

Another aspect of the present invention provides a communication system employing a high power amplifier driven at or near saturation with a first signal and a second signal, wherein the first signal is on a first channel and includes a first transmitted symbol, wherein the second signal is on a second channel and includes a second transmitted symbol and wherein the first channel is different from the second channel. The communication system includes a first interference cancellation unit and a second interference cancellation unit. The first interference cancellation unit can generate a first received symbol corresponding to the first transmitted symbol and being based on the first signal and the second signal. The second interference cancellation unit can generate a second received symbol corresponding to the second transmitted symbol and being based on the first signal and the second signal. The first interference cancellation unit is operable to generate an estimate of interference of a predistorted symbol corresponding to the first received symbol. The first interference cancellation unit is further operable to reduce adjacent channel interference between the first signal and the second signal based on the generated estimate.

A further aspect of the present invention provides a communications method, for a system employing a high power amplifier driven at or near saturation. The system includes a first source signal on a first channel including M symbols, where M is an integer greater than 1, and a second source signal on a second channel. The method includes the generation of a first modulated signal based on the first source signal, and the generation of a second modulated signal based on the second source signal. An added signal is determined based on the first modulated signal and the second modulated signal. Further, a predistorted symbol vector is generated based on an estimate of a distortion of the first through (a−1)-th symbols and an estimate of a distortion of the (a+1)-th through M-th symbols, where $1 \leq a \leq M$. Then, a predistorted symbol ã is generated based on the symbol a of the M symbols and the predistorted symbol vector. A received symbol â is generated corresponding to the predistorted symbol a and being based on the added signal. Additionally, further predistortion of the predistorted symbol a can be generated based on the symbol a of the M symbols, the predistorted symbol vector and the predistorted symbol ã.

A further aspect of the present invention provides a communications method, for a system employing a high power amplifier driven at or near saturation. The system includes a first signal and a second signal, the first signal being on a first channel and including a first transmitted symbol, and the second signal being on a second channel and including a second transmitted symbol. The method includes the generation of a first received symbol corresponding to the first transmitted symbol, which is based on the first signal and the second signal. A second received symbol corresponding to the second transmitted symbol is generated based on the first signal and the second signal. An estimate of interference of a predistorted symbol corresponding to the first received symbol is determined, and adjacent channel interference between the first signal and the second signal is reduced based on the generated estimate.

Additional advantages and novel features of the invention are set forth in part in the description which follows, and in part will become apparent to those skilled in the art upon examination of the following or may be learned by practice of the invention. The advantages of the invention may be realized and attained by means of the instrumentalities and combinations particularly pointed out in the appended claims.

BRIEF SUMMARY OF THE DRAWINGS

The accompanying drawings, which are incorporated in and form a part of the specification, illustrate an exemplary embodiment of the present invention and, together with the description, serve to explain the principles of the invention. In the drawings.

DETAILED DESCRIPTION

The present invention provides a system and method for achieving high energy and high bandwidth efficiency by driving an HPA at or near saturation, while tightly crowding a plurality of channels. The effect of ISI and ACI are reduced by a compensation technique that utilizes the combined effect of hard limitation and predistortion of the transmitted signal and interference cancellation of the received signal.

An aspect of the present invention employs hard-limiter to achieve constant envelope on modulated signal at the input of an HPA. As a result, the HPA can operate in full saturation without introducing additional distortions. This can lead to longer battery life, smaller heat sinks, and lower cost.

In accordance with another aspect of the present invention, ISI may be addressed at the transmitter side by estimating a distortion and subtracting the estimate from the output. In particular, the estimated distortion may be based on the current, past and future symbols of output. Improved estimates of distortion may be calculated by using several stages of distortion estimation where subsequent stages use estimates of the distortion of current, past and future symbols from the previous stage to refine the estimated distortion of the current symbol.

In accordance with another aspect of the present invention, the effect of ACI is reduced by a subtractive interference canceller at the receiver side. For example, ACI may be addressed at the receiver side by estimating the contamination of each channel by the adjacent channels.

An example modulator for addressing ISI in accordance with an aspect of the present invention will now be described below with reference to FIG. 2.

Figure 2:
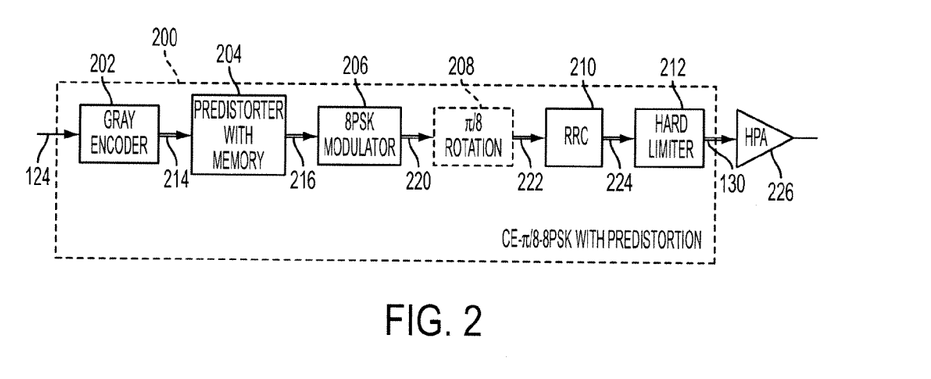
FIG. 2 illustrates an example constant envelope modulator in accordance with an aspect of the present invention.

FIG. 2 illustrates an example constant envelope modulator 200 for use with an HPA 226 driven at or near saturation in accordance with an aspect of the present invention.

Modulator 200 includes a Gray encoder 202, a predistorter 204, a symbol modulator 206, a rotator 208, a filter 210 and a limiter 212. In accordance with an aspect of the present invention, CE-$\pi/8$-8PSK modulator 200 includes the predistorter 204 and limiter 212, detailed operations of which are presented later in the document. As illustrated in the figure, symbol modulator 206 is an example $\pi/8$-8PSK modulator.

Gray encoder 202 takes a symbol to be modulated and alters it as a Gray code. Namely, the symbol as represented in bits is altered such that sequential symbols differ only by a single bit. For example if using a 3-bit symbol, there are 8 possible symbols and one example Gray code would take 000, 001, 010, 011, 100, 101, 110 and 111, representing 0, 1, 2, 3, 4, 5, 6 and 7 and change them to 000, 001, 011, 010, 110, 111, 101 and 100.

A non-limiting example of filter 210 is a root-raised cosine filter. A root-raised cosine filter uses a root-raised cosine function as an approximation of an output cosine wave to convert modulated data into a phased signal for output.

A non-limiting example of limiter 212 is a hard-limiter. A hard-limiter is used to completely remove amplitude information from the output signal such that the output signal contains only phase information at normalized amplitude. In normalizing the amplitude, the hard-limiter provides a constant envelope of operation.

Source signal 124 is first encoded by Gray encoder 202. Gray coded sequence 214 is then predistorted by predistorter 204. Predistorted sequence 216 is then modulated by standard 8-PSK modulator 206. 8-PSK modulated signal 220 then undergoes an additional $\pi/8$ phase rotation to eliminate the possibility of 180° phase changes, by rotator 208.

Phase rotated sequence 222 is then pulse shaped by filter 210 to provide filter output 224. Filter output 224 undergoes hard limitation (removal of amplitude variation) by limiter 212, which outputs modulated signal 130.

For purposes of discussion, take an example situation, where an 8-symbol phrase $a_0 a_1 a_2 a_3 a_4 a_5 a_6 a_7$ is to be transmitted. In this example, the 8-symbol phrase is referred to as the ideal phrase, wherein in an ideal communication system, a receiver would receive the same 8-symbol phrase. However, as a result of distortions, including ISI and ACI, a receiver may receive a distorted form of at least one of the eight symbols in of the ideal 8-symbol phrase.

In accordance with an aspect of the present invention, ISI is addressed by using N stages of predistortion. For example, if N is 2, there are two stages of predistortion. Each symbol in the 8-symbol phrase will be adjusted by subtracting a calculated predistortion from the signal.

The predistortion is calculated for the first stage by way of a predistorter by using the current symbol in addition to past and future symbols to be transmitted on a single channel to calculate a distortion estimate that is removed from the ideal current symbol to be output. For example, the predistortion of symbol $a_5$, referred to as $ã_5$, will be determined based on $a_5$ and an estimated predistortion of each of symbols $a_0 a_1 a_2 a_3 a_4$ and $a_6 a_7$.

Subsequent stages of the predistorter take the estimated output for the current symbol as well as the estimated output for past and future symbols from the previous stage to calculate a new distortion estimate for the current symbol. The new distortion estimate is then subtracted from the ideal current symbol to create a new estimated output. For example, the second stage predistortion of symbol $a_5$, referred to as $ã_5'$, will be determined based on $a_5$, and an estimated predistortion of each of symbols $a_0 a_1 a_2 a_3 a_4$ and $a_6 a_7$, and the first stage predistortion of symbol $a_5$, referred to as $ã_5$.

Figure 9:
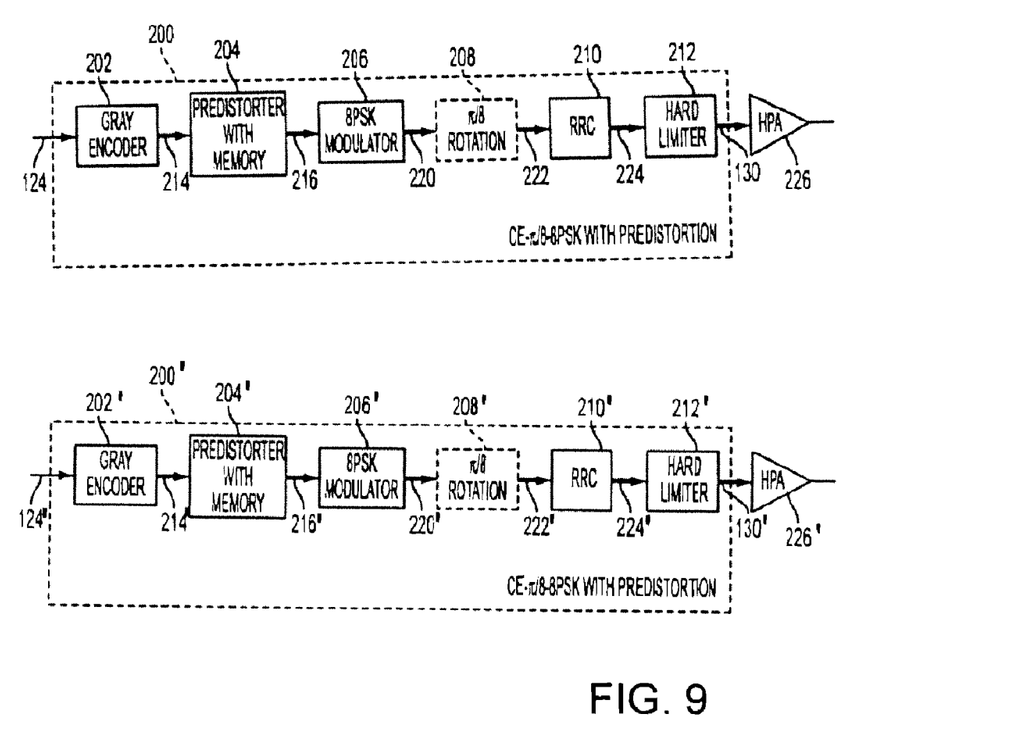
FIG. 9 illustrates an example of a plurality of channels including constant envelope modulators in accordance with an aspect of the present invention.

FIG. 2, only a single modulator 200 is illustrated for use with HPA 226 for purposes of discussion. In accordance with an aspect of the present invention, a plurality of modulators, corresponding to a plurality of separate channels, will be arranged to provide signals to HPA 226, as illustrated in FIG. 9, the plurality of separate channels shown with corresponding components having like reference numerals as discussed in relation to FIG. 2. As such, HPA 226 will be able to amplify a plurality of channels for transmission while being driving at or near saturation.

In the figure, each of signal source 102, Gray encoder 202, predistorter 204, symbol modulator 206, rotator 208, filter 210 and limiter 212 are distinct items. In some embodiments, at least one of signal source 102, Gray encoder 202, predistorter 204, symbol modulator 206, rotator 208, filter 210 and limiter 212 may be combined as a unitary item.

Figure 3:
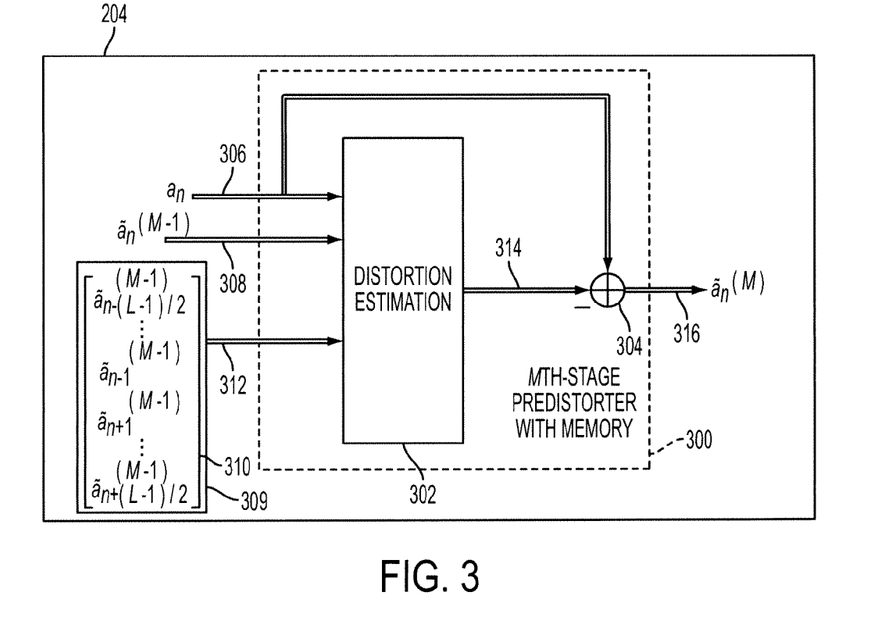
FIG. 3 illustrates an example M-th stage of a predistortion element with memory in accordance with an aspect of the present invention.

FIG. 3 illustrates an example M-th stage 300 of predistorter with memory 204 in accordance with an aspect of the present invention.

M-th stage predistorter 300 includes a distortion estimator 302, an inter-symbol distortion estimating unit 309 and a subtractor 304. M-th stage predistorter 300 takes as input undistorted symbol 306, distorted (M−1)-th symbol 308 and distorted symbol vector 312. Distorted (M−1)-th symbol 308 is the (M−1)-th stage of predistorted version of undistorted symbol 306. The inter-symbol distortion estimating unit creates a distorted symbol vector 312 that is comprised of distorted (M−1)-th vector 310, the (M−1)-th stage predistorted versions of (L−1)/2 past and (L−1)/2 future symbols.

Distortion estimator 302 takes as input undistorted symbol 306, distorted (M−1)-th symbol 308 and distorted symbol vector 312 to calculate distortion estimate 314. Subtractor 304 removes distortion estimate 314 from undistorted symbol 306 to create distorted output 316.

Figure 10:
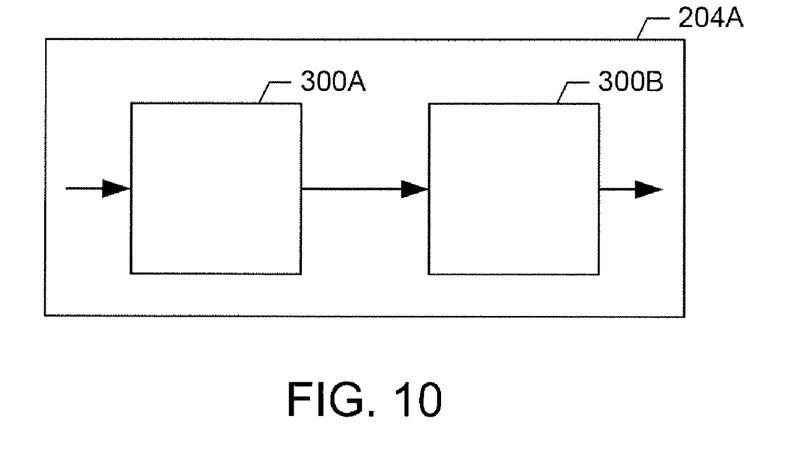
FIG. 10 illustrates an example predistorter including multistage predistortion in accordance with an aspect of the present invention.

By increasing the number of predistortion stages, the predistortion of a symbol will approach the inverse of the actual distortion the symbol may encounter. This will increase the likelihood that a receiver will receive the ideal symbol. However, increasing the number of predistortion stages increases the processing power of the transmitter. FIG. 10 illustrates an example predistorter 204A including multistage predistortion using N states of predistortion where N=2, showing a first stage of predistortion 300A and a second stage of predistortion 300B.

In the figure, distortion estimator 302, inter-symbol distortion estimating unit 309 and subtractor 304 are indicated as distinct items. In some embodiments, at least two of distortion estimator 302, inter-symbol distortion estimating unit 309 and subtractor 304 may be combined as a unitary item.

Now that ISI has been addressed, ACI needs to be addressed in order to transmit a plurality of channels through an HPA in accordance with the present invention. An example receiver that is operable to address ACI in accordance with the present invention will now be described with reference to FIG. 4.

Figure 4:
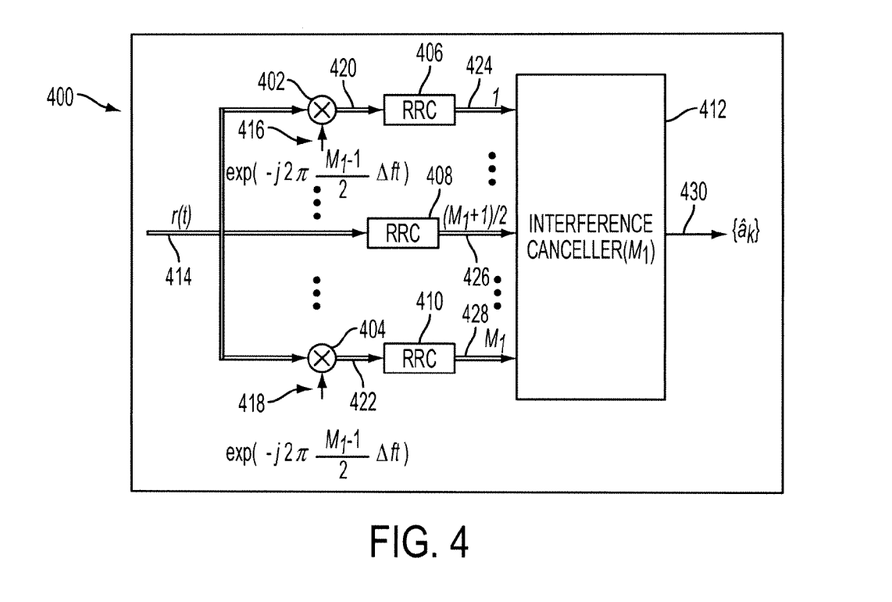
FIG. 4 illustrates an example matched filter bank of channels followed by interference cancellation in accordance with an aspect of the present invention.

FIG. 4 illustrates an example receiver 400 of $M_I$ channels followed by interference cancellation in accordance with an aspect of the present invention.

Receiver 400 includes a mixer 402, a mixer 404, a filter 406, a filter 408, a filter 410 and an interference canceller 412. Receiver 400 is arranged to receive a composite signal 414, which was transmitted from HPA 226 and which was additionally predistorted by a predistorter 300 of FIG. 3.

Received composite signal 414 is frequency translated by local oscillator 402 and match filtered by root raised cosine filter 406 to received channel signal 424. Received composite signal 414 is match filtered by root raised cosine filter 408 to received channel signal 426. Received composite signal 414 is frequency translated by local oscillator 404 and match filtered by root raised cosine filter 410 to received channel signal 428.

Interference canceller 412 is arranged to accept received channel signal 424, received channel signal 426, received channel signal 428 and other adjacent received channel signals that occupy M adjacent channels. Canceller 412 computes an estimate of ACI on, for example, the i-th channel, upon considering received channel signal 424, received channel signal 426, received channel signal 428 and other adjacent channel signals. Canceller 412 then outputs an estimate of the present symbol on i-th channel as received symbol 430, by subtracting estimated interference from the corresponding received channel signal output of the root raised cosine filter on the i-th channel.

In accordance with aspects of the present invention, interference canceller 412 estimates interference of predistorted symbols. In particular, nominal symbols (non-predistorted symbols) will have a different interference associated therewith as compared to the interference associated with predistorted symbols. Accordingly, to accurately estimate the distortion on the receiver end, first there is a decision, or guess, of a received symbol. For example, presume that a nominal symbol to be transmitted from a transmitter is a, and further presume that the predistorted symbol that is actually transmitted (to account for distortions during transmission) is ã. If a received symbol is â* (wherein the * corresponds to noise generated from ACI), the receiver will guess that the nominal transmitted symbol is a. Then, the noise or interference * of the predistorted symbol ã is estimated. At this point, the estimated interference of the predistorted symbol is subtracted from the received symbol âi* to recreate the original predistorted symbol ã.

In some embodiments, the predistortion estimation and subtraction process may be iteratively repeated to improve the accuracy of the estimate of the interference of the predistorted symbol. As the number of iterations increases, the estimate of the interference of the predistorted symbol approaches the real value of the interference of the predistorted symbol. Accordingly, the receiver will more accurately correctly identify the transmitted symbol.

In the figure, mixer 402, mixer 404, filter 406, filter 408, filter 410 and interference canceller 412 are distinct items. In some embodiments, at least one of mixer 402, a mixer 404, a filter 406, a filter 408, a filter 410 and an interference canceller 412 may be combined as a unitary item, or combined in different configurations as multiple items.

The general aspects of a receiver being operable to address ISI and a receiver being operable to address ACI have been described. Now, the benefits of the aspect of the present invention drawn to addressing ISI, for example as discussed above with reference to FIG. 3, will now be further discussed with reference to FIGS. 5A-8B.

Figure 5A:
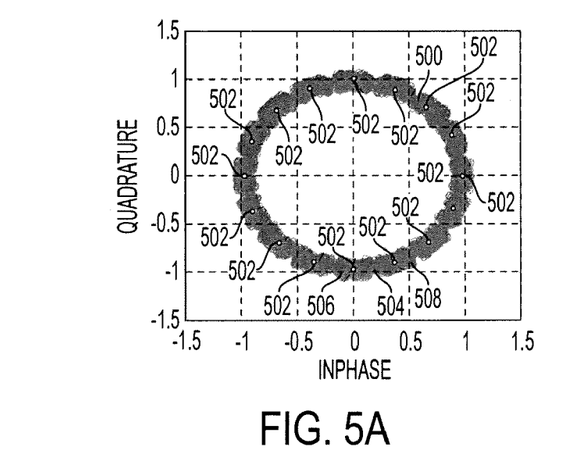
FIG. 5A is a noiseless scattered diagram without predistortion for a case of a single carrier per satellite transponder.

FIG. 5A is a phase diagram of an output signal without predistortion for a single channel transmission using π/8-8PSK modulation.

In the phase diagram, the x-axis represents the in-phase component of an output signal, while the y-axis represents the quadrature component of an output signal. Ideally, a signal should be represented as a point on unit circle 500.

In π/8-8PSK modulation, there are 16 nodes 502 representing the eight symbols that can be transmitted, with two nodes for each symbol. An ideal transmission would lie exactly on one of the nodes. Due to distortion, that is not the case. Point 504 is distorted as a result of the nonlinearity of the transmitter and is close to node 506 and node 508. As such, point 504 can be interpreted as the symbol associated with node 506 or node 508, which may be erroneous if node 506 and node 508 are associated with different symbols.

Figure 5B:
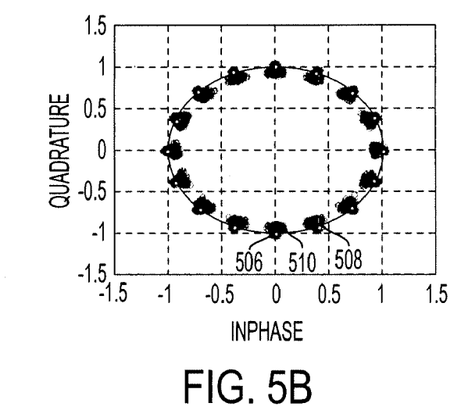
FIG. 5B is a noiseless scattered diagram with one stage of predistortion, in accordance with an aspect of the present invention, for the case of a single carrier per satellite transponder.

FIG. 5B is a phase diagram of an output signal using one stage of predistortion, in accordance with an aspect of the present invention, for a single channel transmission using π/8-8PSK modulation.

In FIG. 5B, distortion due to nonlinearities are reduced by the predistorter, so point 510 is easily determined as associated with node 506.

Figure 5C:
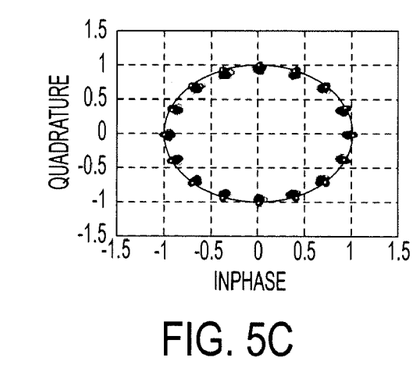
FIG. 5C is a noiseless scattered diagram with five stages of predistortion, in accordance with an aspect of the present invention, for the case of a single carrier per satellite transponder.

FIG. 5C is a noiseless scattered diagram with five stages of predistortion, in accordance with an aspect of the present invention, for the case of a single carrier per satellite transponder;

Comparing FIG. 5A and FIG. 5C, it is clear that, with 5 stages of predistortion (in the case of single carrier per satellite transponder), the amount of distortion is reduced by 7 dB. Also, with five stages of predistortion, the improvement is noticeable over the three stages of predistortion case in FIG. 5B.

Figure 6A:
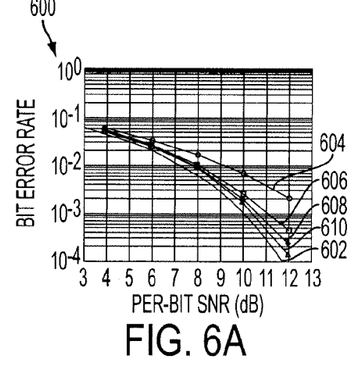
FIG. 6A illustrates bit error rate performances for single-channel multistage predistortion in additive white Gaussian noise.

FIG. 6A is a graph 600 that illustrates bit error rate performances for single-channel multistage predistortion in additive white Gaussian noise as function of Per Bit SNR (dB). In graph 600, function 602 represents the bit error rate for a linearly amplified signal that had been 8PSK-modulated. Function 604 represents the bit error rate for a signal that had been CE-8PSK-modulated without any predistortion. Function 606 represents the bit error rate for a signal that had been CE-8PSK-modulated with 1-stage of predistortion in accordance with an aspect of the present invention. Function 608 represents the bit error rate for a signal that had been CE-8PSK-modulated with 5-stages of predistortion in accordance with an aspect of the present invention. Function 610 represents the bit error rate for a signal that had been CE-8PSK-modulated with 10-stages predistortion in accordance with an aspect of the present invention.

As illustrated in FIG. 6A, the bit error rate improves as the SNR per bit increases for each function. It should be noted that the down-ward curvature of the functions increases as the number of stages in the predistorter increases. In other words, the rate of improvement of the bit error rate increases as the number of stages in the predistorter increases. Furthermore, the bit error rate for a fixed Per-Bit SNR substantially improves as the number of stages in the predistorter increases.

Figure 6B:
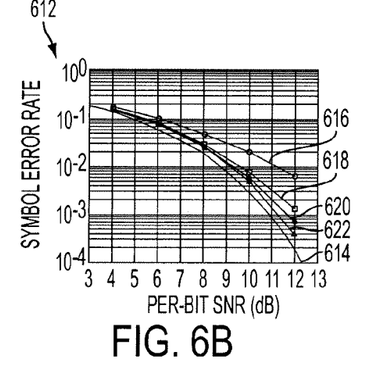
FIG. 6B illustrates symbol error rate performances for single-channel multistage predistortion in additive white Gaussian noise.

FIG. 6B is a graph 612 that illustrates symbol error rate performances for single-channel multistage predistortion in additive white Gaussian noise as function of Per Bit SNR (dB). In graph 612, function 614 represents the symbol error rate for a linearly amplified signal that had been 8PSK-modulated. Function 616 represents the symbol error rate for a signal that had been CE-8PSK-modulated without any predistortion. Function 618 represents the symbol error rate for a signal that had been CE-8PSK-modulated with 1-stage of predistortion in accordance with an aspect of the present invention. Function 620 represents the symbol error rate for a signal that had been CE-8PSK-modulated with 5-stages of predistortion in accordance with an aspect of the present invention. Function 622 represents the symbol error rate for a signal that had been CE-8PSK-modulated with 10-stages predistortion in accordance with an aspect of the present invention.

As illustrated in FIG. 6B, the symbol error rate improves as the SNR per bit increases for each function. It should be noted that the down-ward curvature of the functions increases as the number of stages in the predistorter increases. In other words, the rate of improvement of the symbol error rate increases as the number of stages in the predistorter increases. Furthermore, the symbol error rate for a fixed Per-Bit SNR substantially improves as the number of stages in the predistorter increases.

The benefits of the aspect of the present invention addressing ACI, for example as discussed above with reference to FIG. 4, will now be further discussed with reference to FIGS. 7A-18B.

Figure 7A:
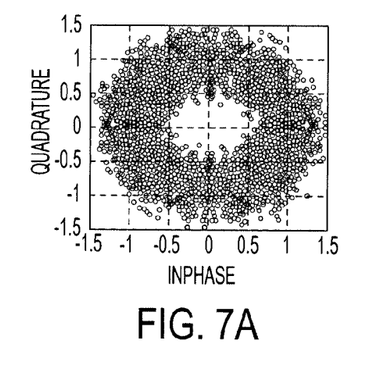
FIG. 7A is a noiseless scattered diagram without interference cancellation for a case of multiple carriers per satellite transponder.
Figure 7B:
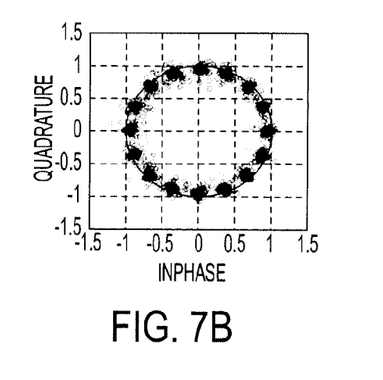
FIG. 7B is a noiseless scattered diagram with interference cancellation, in accordance with an aspect of the present invention, for a case of multiple carriers per satellite transponder.

FIG. 7A is a noiseless scattered diagram with predistortion but without interference cancellation for a case of HPA 226 being driven at or near saturation with multiple channels. In this example, because of distortion due to nonlinearities of the channel and hard-limiter, signal points are scattered and overlapping around ideal signal points, the locus of which being the circle 700.

FIG. 7B is a noiseless scattered diagram with both predistortion and interference cancellation in HPA 226 being driven at or near saturation with multiple channels in accordance with an aspect of the present invention. As illustrated in the figure, substantial improvement in distortion and interference reduction is evident.

Figure 8A:
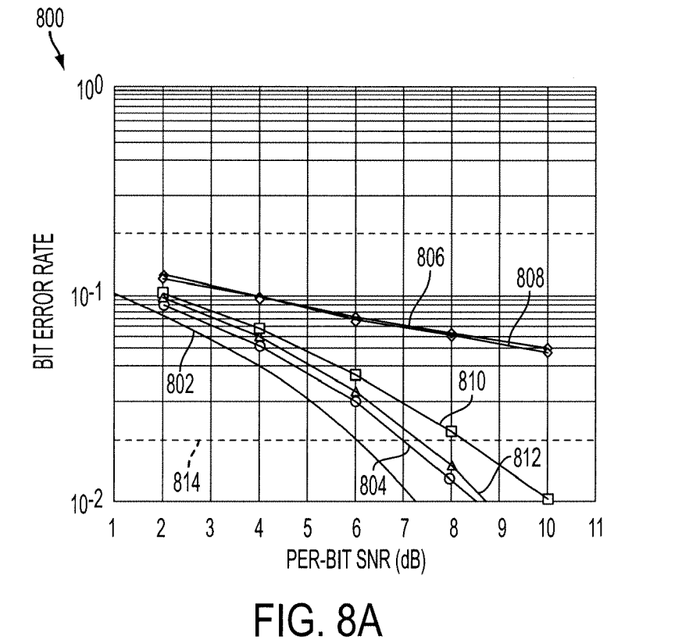
FIG. 8A illustrates bit error rate performances for multiple carriers per satellite transponder.

FIG. 8A shows the graph 800 that illustrates bit error rate performance for three channel multistage predistortion in additive white Gaussian noise as function of Per Bit SNR (dB). In graph 800, function 802 represents the bit error rate of a received signal that had been linearly amplified and 8PSK-modulated. Function 802 represents an ideal received signal bit error rate as a function of Per Bit SNR (for example if no need to use HPA 226 driven at or near saturation). Function 804 represents the bit error rate of a received, single channel signal that had CE-8PSK-modulated. Because the received signal corresponding to function 804 is on a single-channel, there is no associated ACI. Function 806 represents the bit error rate of a received, three-channel signal that had been CE-8PSK-modulated without predistortion and without ACI cancellation. Function 808 represents the bit error rate of a received, three-channel signal that had been CE-8PSK-modulated with predistortion but without ACI cancellation. Function 810 represents the bit error rate of a received, three-channel signal that had been CE-8PSK-modulated with predistortion in accordance with an aspect of the present invention, but without ACI cancellation. Function 812 represents the bit error rate of a received, three-channel signal that had been CE-8PSK-modulated with predistortion in accordance with an aspect of the present invention, and with ACI cancellation in accordance with an aspect of the present invention.

To gain insight from graph 800, consider a case where the bit error rate is fixed at $2\times10^{-2}$, as indicated by dotted line 814. In such an example case, the ideal Per Bit SNR of function 802 is approximately 6 dB. The signal having only a single channel, function 804, has the next best performance at approximately 7 dB. This is because the single channel case has no ACI contributing to the bit error rate. The signal having three channels and having predistortion and ACI cancellation in accordance with an aspect of the present invention, function 812, has the next best performance at approximately 7.2 dB. The signal having three channels and having predistortion in accordance with an aspect of the present invention but no ACI cancellation, function 810, has the next best performance at approximately 7.8 dB. Functions 806 and 808, corresponding to conventional methods, do not do not intercept dotted line 814 on graph 800.

It is clear from graph 800, that using predistortion in accordance with the present invention greatly improves the Per Bit SNR for a fixed bit error rate. This is evident from functions 812 and 810, associated with the predistortion method in accordance with the present invention, as compared to functions 806 and 808, associated with conventional methods. Further, using ACI cancellation in accordance with the present invention greatly improves the Per Bit SNR, for a fixed bit error rate. This is evident from function 812, associated with the ACI cancellation method in accordance with the present invention, as compared to function 810, associated with a lack of ACI cancellation.

Figure 8B:
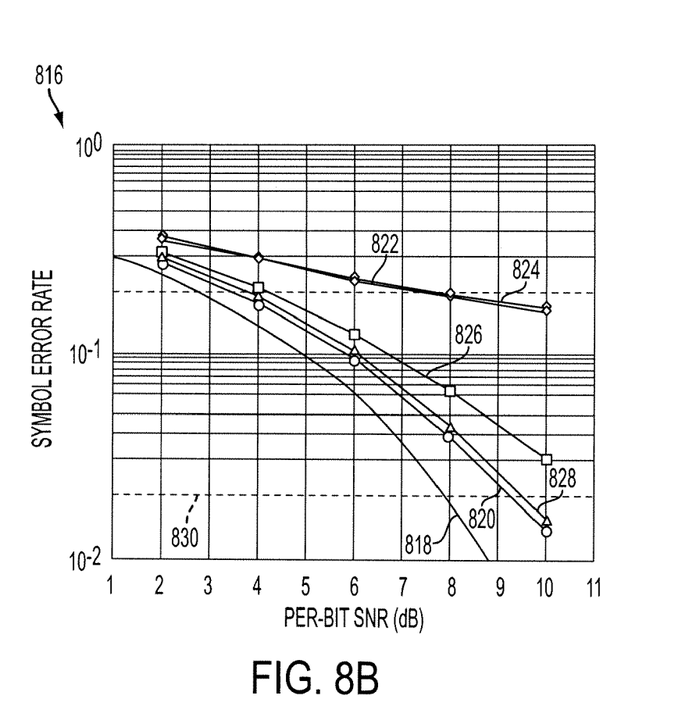
FIG. 8B illustrates symbol error rate performances for multiple carriers per satellite transponder.

FIG. 8B shows graph 816 that illustrates symbol error rate performance for three channel multistage predistortion in additive white Gaussian noise as function of Per Bit SNR (dB). In graph 816, function 818 represents the symbol error rate of a received signal that had been linearly amplified and 8PSK-modulated. Function 818 represents an ideal received signal symbol error rate as a function of Per Bit SNR. Function 820 represents the symbol error rate of a received, single channel signal that had CE-8PSK-modulated. Because the received signal corresponding to function 820 is on a single-channel, there is no associated ACI. Function 822 represents the symbol error rate of a received, three-channel signal that had been CE-8PSK-modulated without predistortion and without ACI cancellation. Function 824 represents the symbol error rate of a received, three-channel signal that had been CE-8PSK-modulated with predistortion but without ACI cancellation. Function 826 represents the symbol error rate of a received, three-channel signal that had been CE-8PSK-modulated with predistortion in accordance with an aspect of the present invention, but without ACI cancellation. Function 828 represents the symbol error rate of a received, three-channel signal that had been CE-8PSK-modulated with predistortion in accordance with an aspect of the present invention, and with ACI cancellation in accordance with an aspect of the present invention.

To gain insight from graph 816, consider a case where the symbol error rate is fixed at $2\times10^{-2}$, as indicated by dotted line 830. In such an example case, the ideal Per Bit SNR of function 818 is approximately 7.9 dB. The signal having only a single channel, function 820, has the next best performance at approximately 9.3 dB. This is because the single channel case has no ACI contributing to the bit error rate. The signal having three channels and having predistortion and ACI cancellation in accordance with an aspect of the present invention, function 828, has the next best performance at approximately 9.5 dB. The signal having three channels and having predistortion in accordance with an aspect of the present invention but no ACI cancellation, function 826, does not intercept dotted line 830 on graph 816. Further, functions 822 and 824, corresponding to conventional methods, additionally do not intercept dotted line 830 on graph 816.

As can be observed in FIGS. 8A and 8B, the two uppermost curves (or the ones with the worst performance) are generated when interference cancellation is not employed. Using prior art predistortion does not improve the situation and has limited advantage when channel frequency spacing is small. On the other hand, the performance when using interference cancellation is improved greatly. Performance is further improved by using combined predistortion and interference cancellation. For example, at BER of 0.001, the degradation is within only 0.1 dB relative to the interference-free case. This small additional energy requirement is achieved while still maintaining small channel spacing and using amplifiers that operate at full saturation.

A more mathematically detailed discussion of a communication system in accordance with aspects of the present invention will now be provided. In the following discussion, presume that a transmitted signal r(t), is transmitted from HPA 226 operating at, or near, saturation. Further, the transmitted signal r(t) includes a plurality of signals on a respective plurality of adjacent channels.

Received waveform r(t) 414 in FIG. 4, which includes of output signal 144 of transmitter 100 in FIG. 1 and associated noise, is $$r(t) = s(t) + n(t) \tag{1}$$

Noise n(t) is assumed as standard Additive White Gaussian Noise (AWGN) with single-sided Power Spectral Density (PSD) level of $N_0$ (Watts/Hz). Output signal s(t) 144 includes N adjacent channels within a satellite transponder; each is transmitting at the rate of $T_s^{-1}$ with an arbitrary unit-energy pulse p(t). The signal can be described in baseband format as $$s(t) = Re\{\tilde{s}(t) \cdot e^{j2\pi f_c t}\}, \tag{2}$$

where $f_c$ is the carrier frequency and $\tilde{s}(t)$ is the baseband complex envelope of the signal and is mathematically expressed as $$\tilde{s}(t) = \sum_{n=-(N-1)/2}^{(N-1)/2} \tilde{s}_{HL,n}(t) \cdot \alpha_n \cdot \exp(j \cdot 2\pi \cdot \Delta f_n t + \theta_n), \tag{3}$$

where N is assumed as an odd integer without loss in generality. The center channel conveys the desired data and the other signals are viewed as being adjacent channel interferers, (N−1)/2 on either side. In practical systems the channels are equally spaced in frequency, say by Δf, or $$\Delta f_n = \left(n - \frac{N+1}{2}\right) \cdot \Delta f; \quad n = 1, 2, \ldots, N. \tag{4}$$

In accordance with an aspect of the present invention, ISI and ACI filtering techniques are of importance when channel frequency spacing is small enough to cause large amount of overlap in signal spectra. Smaller channel spacing translates into higher bandwidth efficiency. The bandwidth efficiency, η, in bits-per-second/Hz is defined as the ratio of the bit rate to the bandwidth used or $$\eta = \frac{\log_2(M)}{\Delta f \cdot T_s}, \tag{5}$$

where M is the order of the modulation or the alphabet size. The n-th channel signal, for example the channel providing signal 130 of FIG. 1, includes hard-limiter (HL) 212 to ensure a constant envelope. In other words, there is a constant amplitude in the signal within the channel. The signal can be described mathematically as $$\tilde{s}_{HL,n}(t) = \exp(j \cdot \Phi_{s,n}(t)), \tag{6}$$

where $\Phi_{s,n}(t)$ is the phase of the complex-valued signal stream $\tilde{s}_n(t)$, for example signal 222 of FIG. 2, and is given by $$\tilde{s}_n(t) = \sum_k a_{n,k} \cdot p(t - kT_s - \varepsilon_n T_s). \tag{7}$$

Another implementation of hard-limiter 212 is $$\tilde{s}_{HL,n}(t) = \frac{\tilde{s}_n(t)}{|\tilde{s}_n(t)|}. \tag{8}$$

Signal $\tilde{s}_{HL,n}(t)$, for example signal 130 at the output of hard-limiter 212 as illustrated in FIG. 2, has exact constant envelope and hence does not suffer from additional distortions introduced by saturated power amplifiers.

To illustrate the capability of the present invention, the data streams $\{a_{n,k}; n=-(N-1)/2, \ldots, (N-1)/2\}$ consist of π/8-8PSK symbols. However, any other modulation format can benefit from this invention. Other modulations such as standard QPSK, MPSK, M-QAM, or their offset variations can also be used.

For standard MASK, the symbols are uniformly distributed on the unit circle, or for the k-th symbol in the n-th data stream, it is expressed as $$a_{n,k} \in \left\{\exp\left(\sqrt{-1} \cdot \left(\frac{(i-1) \cdot \pi}{M} + \frac{\pi}{M}\right)\right); \quad i = 1, 2, \ldots, M\right\} \tag{9}$$

To generate π/M-MPSK, each symbol is further rotated by an additional π/M relative to the previous symbol. This rotation every symbol avoids phase transitions of 180 degrees between adjacent symbols that is experienced with the standard MPSK. This is preferable in the presence of non-linear characteristics in practical systems.

Multistage predistortion implemented at the transmitter in accordance with the present invention, for example as discussed above with reference to FIG. 3, shall now be described in mathematical detail.

To compensate for the non-linear ISI that is present due to the hard-limiter 212 or the non-linear characteristic of the saturated HPA 226, multistage predistortion with total memory of L symbols is introduced. This method entails estimating the distortion that would result from passing the current symbol 306, distorted (M−1)-th vector 310 (including the (M−1)-th stage predistorted versions of (L−1)/2 past and (L−1)/2 future symbols) through the cascade of transmitter filter 210, hard-limiter 212 and receiver filter 406. This distortion estimate 314 is then subtracted from the current symbol 306 at the modulator before transmission.

For progressively improved performance, this predistortion method is applied repeatedly. Here, the distortion estimate is generated by passing the current predistorted symbol, (L−1)/2 previous predistorted symbols and (L−1)/2 future predistorted symbols through the cascade of transmitter filter, hard-limiter and receiver filter. This improved distortion estimate is then subtracted from the current symbol at the modulator before transmission.

More specifically, for the first stage of predistortion, the effect of the transmitter filter on the current symbol and its adjacent symbols for the m-th channel is computed as $$\alpha_{L,m,k}(t) = \sum_{i=k-(L-1)/2}^{k+(L-1)/2} a_{m,i} \cdot p(t - iT_s). \tag{10}$$

Next, the effect of hard-limiter 212 on the result by decomposing $\alpha_{L,m,k}(t)$ into amplitude and phase is computed as $$\alpha_{L,m,k}(t) = |\alpha_{L,m,k}(t)| \cdot \exp(j \cdot \Phi_{\alpha,m,k}(t)). \tag{11}$$

Then output 130 of hard-limiter 212 is computed as $$\beta_{L,m,k}(t) = \exp(j \cdot \Phi_{\alpha,m,k}(t)) \tag{12}$$

or $$\beta_{L,m,k}(t) = \frac{\alpha_{L,m,k}(t)}{|\alpha_{L,m,k}(t)|}. \tag{13}$$

To incorporate the effect of the complete cascade, the impact of receiver filter 406 on $\beta_{L,m,k}(t)$ is computed as $$x_m(t) = \int \beta_{L,m,k}(\tau) \cdot p^*(\tau - t) \cdot d\tau. \tag{14}$$

The distortion estimate, for example signal 314 of FIG. 3, of the first stage for the m-th channel is computed as $$d_{L,m,k}^{(1)} = x_m(k \cdot T_s). \tag{15}$$

The last step is to subtract this distortion estimate from the current symbol, for example item 306 of FIG. 3, to produce the 1$^{st}$-stage predistorted symbol with memory L for the m-th channel, $\tilde{a}_{L,m,k}^{(1)}$, or $$\tilde{a}_{L,m,k}^{(1)} = a_{m,k} - d_{L,m,k}^{(1)} \cdot \lambda_1, \tag{16}$$

where $\lambda_1$ is a scale factor to set the amount of residual distortion and is typically chosen as unity.

The steps to generate the s-stage predistorted symbol 316 are similar, except that one starts with the predistorted symbols 312 from the (s−1) stage as $$\alpha_{L,m,k}^{(s)}(t) = \sum_{i=k-(L-1)/2}^{k+(L-1)/2} \tilde{a}_{L,m,i}^{(s-1)} \cdot p(t - iT_s). \tag{17}$$

Next, the effect of hard-limiter 212 on the result is computed by decomposing $\alpha_{L,m,k}^{(s)}(t)$ into amplitude and phase as $$\alpha_{L,m,k}^{(s)}(t) = |\alpha_{L,m,k}^{(s)}(t)| \cdot \exp(j \cdot \Phi_{\alpha,k,m}^{(s)}(t)). \tag{18}$$

Then output 130 of hard-limiter 212 is computed as $$\beta_{L,k,m}^{(s)}(t) = \exp(j \cdot \Phi_{\alpha,k,m}^{(s)}(t)) \tag{19}$$

or $$\beta_{L,k,m}^{(s)}(t) = \frac{\alpha_{L,m,k}^{(s)}(t)}{|\alpha_{L,m,k}^{(s)}(t)|}. \tag{20}$$

To incorporate the effect of the complete cascade, the impact of receiver filter 406 on $\beta_{L,m,k}^{(s)}(t)$ is computed as $$x_m^{(s)}(t) = \int \beta_{L,k,m}^{(s)}(\tau) \cdot p^*(\tau - t) \cdot d\tau. \tag{21}$$

The distortion estimate, for example item 314 of FIG. 3, of the s-stage for the m-th channel is computed as $$d_{L,m,k}^{(s)} = x_m^{(s)}(k \cdot T_s). \tag{22}$$

The last step is to subtract distortion estimate 314 from current symbol 306 to produce the s-stage predistorted symbol 316 with memory L for the m-th channel, $\tilde{a}_{L,m,k}^{(s)}$, or $$\tilde{a}_{L,m,k}^{(s)} = a_{m,k} - d_{L,k,m}^{(s)} \cdot \lambda_s, \tag{23}$$

where $\lambda_s$ is a scale factor to set the amount of residual distortion and is typically chosen as unity.

Noteworthy in this respect is that the proposed implementation computes the distortion estimate $d_{L,k,m}^{(s)}$ on the fly. Another implementation is possible that may include a RAM to prestore a lookup table, which is addressed by the symbols within the span of the predistorter memory. This table-based implementation is less preferred in the case of sending higher-order modulations as the table size can grow very large, very quickly. For example, for π/M-MPSK modulation, the required table size is $M^L$ where L is the memory span. This table size can be reduced by exploiting constellation symmetry but still would be large when using large alphabet size required for maximizing data throughput.

In addition, a memory-less predistorter is a special case of the proposed scheme, which results when the memory span of the predistorter is set to one. Memory-less predistortion can help only with the warping effect but is not capable of reducing the amount of clustering due to ISI that is experienced here.

According to an aspect of the invention, receiver 400 uses an interference canceller 412 coupled with use of predistorter 204 at transmitter 100. Interference cancellation with predistortion will now be described in more detail.

As stated previously, the major drawback to the hard-limiter or the non-linear characteristic of saturated HPA 226 is the spectral regrowth. This coupled with the need to maximize the efficient utilization of bandwidth causes severe interference. In accordance with an aspect of the present invention, subtractive interference cancellation with multistage predistortion is used to compensate for the ISI resulting from the non-linear distortion and more importantly the ACI when using multiple carriers within a satellite transponder. The method entails estimating the ACI that would result from passing the estimated symbols from adjacent channels through the cascade of transmitter filter of adjacent channels, hard-limiter and receive filter at the desired channel. This interference estimate is then subtracted from the matched-filter bank at the receiver before making a decision on which symbol was transmitted.

Other optimization techniques can also be used to arrive at the predistorted constellation. The method of computing multistage predistortion outlined above will now be describe in greater detail.

More specifically, to estimate the interference from m'-th channel on the desired m-th channel, the symbols from the m'-th channel are first estimated as $$\hat{a}_{m',n} = \text{Decision}(x_{m'}(nT_s)), \quad (24)$$

where $x_{m'}$ is the matched filter at the m'-th channel. More on the decision device Decision(z) will b described below.

Multistage predistortion in accordance with an aspect of the present invention as discussed above is then applied to generate the s-stage predistorted symbol with memory L for the m'-th channel, $\tilde{a}_{L,m',k}^{(s)}$. To compute the effect of the transmitter filter on the estimated predistorted symbols, the method implements $$\eta_{m'}(t) = \left[ \sum_n \tilde{a}_{L,m',k}^{(s)} \cdot p(t - nT_s) \right]. \quad (25)$$

Next, the effect of hard-limiter 212 on the result is computed by decomposing $\eta_m(t)$ into amplitude and phase as $$\eta_{m'}(t) = |\eta_{m'}(t)| \cdot \exp(j \cdot \Phi_{\eta,m'}(t)). \quad (26)$$

Then, output 130 of hard-limiter 212 is computed as $$\mu_{m'}(t) = \exp(j \cdot \Phi_{\eta,m'}(t)) \quad (27)$$

or $$\mu_{m'}(t) = \frac{\eta_{m'}(t)}{|\eta_{m'}(t)|}. \quad (28)$$

To incorporate the effect of the complete cascade, the impact of the receiver filter on $\mu_{m'}(t)$ as well as the channel spacing, for example signal 424 as illustrated in FIG. 4, is given by $$\xi_{m',m}(t) = \int \mu_{m'}(\tau) \cdot \exp(-j2\pi \cdot (\Delta f_m - \Delta f_{m'}) \cdot \tau) \cdot p^*(\tau - t) \cdot d\tau. \quad (29)$$

The interference estimate for the m-th channel using $(M_I-1)/2$ adjacent channels on either side is computed as $$I_{m,k}^{(M_I)} = \sum_{i=-(M_I-1)/2}^{(M_I-1)/2} \alpha_{m-i} \cdot \xi_{m-i,m}(kT_s); \quad i \neq 0, \quad (30)$$

where $\alpha_m$ is related to the power level of the m-th channel.

The last step is to subtract this interference estimate from the current matched filter output before applying the decision device to produce the desired symbol estimate, for example item 430 of FIG. 4, or $$\hat{a}_{m,k}^{(M_I)} = \text{Decision}(x_m(kT_s) - I_{m,k}^{(M_I)} \cdot \theta_1), \quad (31)$$

where $\theta_1$ is a scale factor to set the amount of residual interference and is typically chosen as unity.

Figure 11:
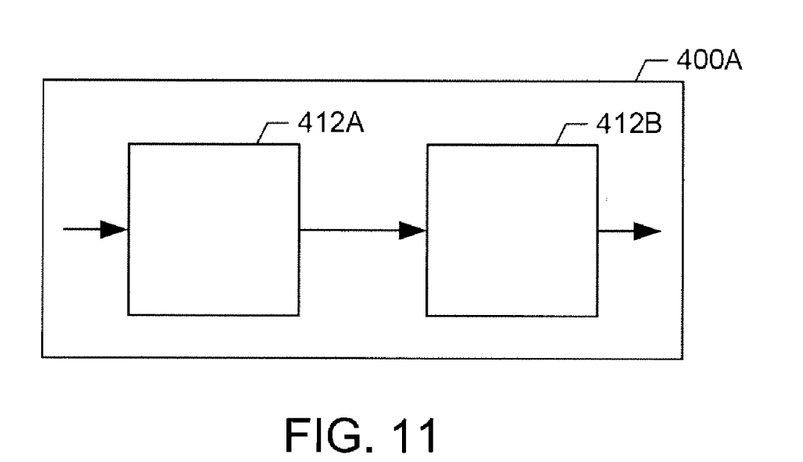
FIG. 11 illustrates an example receiver including multistage interference cancelation in accordance with an aspect of the present invention.

To improve performance progressively, this interference cancellation method may be applied repeatedly in a multistage fashion as explained previously with respect to multistage predistortion, and as illustrated in FIG. 11. FIG. 11 illustrates an example receiver 400A including multistage interference cancelation using N states of interference cancelation where N=2, showing a first stage of interference cancelation 412A and a second stage of interference cancelation 412B.

The decision device Decision(z) equations (24) and (31) can be any mapping function that produces estimates of the interfering symbols including, non-limiting examples of which include a soft-decision device that uses reliability information provided by the FEC decoder such as log-likelihood ratios one that does not use FEC decoder information and is therefore simpler to implement.

As mentioned previously that the use of 8PSK modulation is only for illustrative purposes. The proposed techniques are effective with other modulations as well such as M-QAM and higher-order MPSK or their offset variations. Also, even though a hard-limiter is used at the transmitter to ensure constant envelope, the same techniques proposed here are effective when the hard-limiter is not incorporated or when the hard-limiter is replaced with HPA 226 with non-linear characteristics. Finally, there are other optimization techniques that can be employed to arrive at the predistorted constellation. Any of these techniques can be combined with interference cancellation to benefit from this invention.

Conventional satellite communication systems with HPAs have been able address ISI over a single channel. As such, conventional satellite communication systems with HPAs are able to drive the HPAs at or near saturation for a single channel to operate efficiently. However, conventional satellite communication systems with HPAs that have addressed ISI are not able to transmit over a plurality of channels because they have not been able to additionally correct for ACI.

As discussed above, in accordance with the present invention a satellite communication system with an HPA is operable to drive the HPA at or near saturation for a plurality of channels. Specifically, in accordance with the present invention, a satellite communication system having a plurality of channels addresses ISI and ACI. In some embodiments, ISI is addressed at a transmitter end, whereas ACI is addressed at a receiver end. In some example embodiments, ISI is addressed through a predistorter that takes into account an estimated distortion of adjacent symbols within a phrase. Further in some example embodiments, a predistorter may be staged such that the predistortion is iterated to more accurately estimate predistortion required to address ISI. In some example embodiments, ACI is addressed through interference canceller that takes into account an estimated interference of a received predistorted symbol. Further in some example embodiments, an interference canceller may be staged such that the interference estimation is iterated to more accurately estimate interference required to address ISI.

The foregoing description of various preferred embodiments of the invention have been presented for purposes of illustration and description. It is not intended to be exhaustive or to limit the invention to the precise forms disclosed, and obviously many modifications and variations are possible in light of the above teaching. The exemplary embodiments, as described above, were chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed as new and desired to be protected by Letters Patent of the United States is:

1. A communications system employing a high power amplifier driven at or near saturation, having a first source signal and a second source signal, the first source signal being on a first channel and including M symbols, where M is an integer greater than 2, and the second source signal being on a second channel, the communication system comprising:
   a first modulator unit operable to generate a first modulated signal based on the first source signal, and including a first inter-symbol distortion estimating unit and a first stage predistortion unit; and wherein the first inter-symbol distortion estimating unit is operable to generate a predistorted symbol vector based on an estimate of a distortion of the first through (a−1)-th symbols and an estimate of a distortion of the (a+1)-th through M-th symbols, where $1 \leq a \leq M$;

wherein the first stage predistortion unit is operable to generate a predistorted symbol ã based on the a-th symbol of the M symbols and the predistorted symbol vector; and wherein the first modulator unit further comprises a second stage predistortion unit operable to further predistort the predistorted symbol ã based on the a-th symbol of the M symbols, the predistorted symbol vector and the predistorted symbol ã.

2. The communications system of claim 1, further comprising a filter operable to provide a filtered signal based on the first modulated signal, the filtered signal having a constant envelope.

3. The communications system of claim 1, further comprising:
 a second modulator unit operable to generate a second modulated signal based on the second source signal, and including a second inter-symbol distortion estimating unit and a second predistortion unit; and
 an interference cancellation unit operable to generate a received symbol â corresponding to the predistorted symbol ã and being based on the second modulated signal.

4. The communications system of claim 1, further comprising:
 a second modulator unit operable to generate a second modulated signal based on the second source signal, and including a second inter-symbol distortion estimating unit and a second predistortion unit;
 an adder operable to generate an added signal based on the first modulated signal and the second modulated signal; and
 an interference cancellation unit operable to generate a received symbol a corresponding to the predistorted symbol ã and being based on the added signal.

5. The communications system of claim 4, further comprising a filter operable to provide a filtered signal based on the first modulated signal, the filtered signal having a constant envelope.

6. A communications system employing a high power amplifier driven at or near saturation, having a first signal and a second signal, the first signal being on a first channel and including a first transmitted symbol, and the second signal being on a second channel and including a second transmitted symbol, the communication system comprising:
 a first interference cancellation unit operable to generate a first received symbol corresponding to the first transmitted symbol and being based on the first signal and the second signal; and
 a second interference cancellation unit operable to generate a second received symbol corresponding to the second transmitted symbol and being based on the first signal and the second signal; and
 wherein the first interference cancellation unit is operable to generate an estimate of interference of a predistorted symbol corresponding to the first received symbol; and
 wherein the first interference cancellation unit is further operable to reduce adjacent channel interference between the first signal and the second signal based on the generated estimate.

7. The communications system of claim 6, further comprising a filter operable to provide a filtered signal to the first interference cancellation unit, wherein the filtered signal is based on the first signal.

8. A communications system employing a high power amplifier driven at or near saturation, having a first source signal and a second source signal, the first source signal being on a first channel and including M symbols, where M is an integer greater than 2, and the second source signal being on a second channel, the communication system comprising:
 a transmitter unit, the transmitter unit being operable to transmit a first signal over the first channel and to transmit a second signal over the second channel; and
 a receiver unit, the receiver unit being operable to receive a third signal over the first channel and to receive a fourth signal over the second channel, the third signal being based on the first signal and the fourth signal being based on the second signal; and
 wherein the transmitter unit comprises a predistortion unit operable to predistort the first signal to reduce inter-symbol interference; and
 wherein the receiver unit comprises an interference cancellation unit operable to reduce adjacent channel interference between the third signal and the fourth signal.

9. The communications system of claim 8, wherein the transmitter unit comprises a first modulator unit operable to generate a first modulated signal based on the first source signal, and includes a first inter-symbol distortion estimating unit and a first stage predistortion unit; and
 wherein the first inter-symbol distortion estimating unit is operable to generate a predistorted symbol vector based on an estimate of a distortion of the first through (a−1)-th symbols and an estimate of a distortion of the (a+1)-th through M-th symbols, where $1 \leq a \leq M$;
 and wherein the first stage predistortion unit is operable to generate a predistorted symbol ã based on the a-th symbol α of the M symbols and the predistorted symbol vector.

10. The communications system of claim 9, wherein the first modulator unit further comprises a second stage predistortion unit operable to further predistort the predistorted symbol a based on the a-th symbol of the M symbols, the predistorted symbol vector and the predistorted symbol ã.

11. The communications system of claim 9, further comprising a filter operable to provide a filtered signal based on the first modulated signal, the filtered signal having a constant envelope.

12. The communications system of claim 9, wherein the transmitter unit further comprises:
 a second modulator unit operable to generate a second modulated signal based on the second source signal, and including a second inter-symbol distortion estimating unit and a second predistortion unit; and
 an interference cancellation unit operable to generate a received symbol corresponding to the predistorted symbol ã and being based on the second modulated signal.

13. The communications system of claim 9, wherein the transmitter unit further comprises:
 a second modulator unit operable to generate a second modulated signal based on the second source signal, and including a second inter-symbol distortion estimating unit and a second predistortion unit;
 an adder operable to generate an added signal based on the first modulated signal and the second modulated signal; and an interference cancellation unit operable to generate a received symbol â corresponding to the predistorted symbol ã and being based on the added signal.

14. The communications system of claim 13, further comprising a filter operable to provide a filtered signal based on the first modulated signal, the filtered signal having a constant envelope.

15. A communications method, for a system employing a high power amplifier driven at or near saturation, and having a first source signal on a first channel including M symbols, where M is an integer greater than 2, and a second source signal on a second channel, the method comprising the steps of:
   generating a first modulated signal based on the first source signal; generating a predistorted symbol vector based on an estimate of a distortion of the first through (a−1)-th symbols and an estimate of a distortion of the (a+1)-th through M-th symbols, where $1 \leq a \leq M$;
   generating a predistorted symbol ã based on the a-th symbol of the M symbols and the predistorted symbol vector; and
   generating a further predistortion of the predistorted symbol ã based on the a-th symbol of the M symbols, the predistorted symbol vector and the predistorted symbol ã.

16. The communications method of claim 15, further comprising steps of:
   generating a second modulated signal based on the second source signal; and
   generating a received symbol â corresponding to the predistorted symbol ã and being based on the second modulated signal.

17. The communications method of claim 15, further comprising steps of:
   generating a second modulated signal based on the second source signal; and
   generating an added signal based on the first modulated signal and the second modulated signal; and
   generating a received symbol â corresponding to the predistorted symbol ã and being based on the added signal.

18. A communications method, for a system employing a high power amplifier driven at or near saturation, and having a first signal and a second signal, the first signal being on a first channel and including a first transmitted symbol, and the second signal being on a second channel and including a second transmitted symbol, the method comprising the steps of:
   generating a first received symbol corresponding to the first transmitted symbol and being based on the first signal and the second signal;
   generating a second received symbol corresponding to the second transmitted symbol and being based on the first signal and the second signal;
   generating an estimate of interference of a predistorted symbol corresponding to the first received symbol; and
   reducing adjacent channel interference between the first signal and the second signal based on the generated estimate.

* * * * *